US005190701A

United States Patent [19]

Larsson

[11] Patent Number: 5,190,701

[45] Date of Patent: Mar. 2, 1993

[54] METHOD AND EQUIPMENT FOR MICROATOMIZING LIQUIDS, PREFERABLY MELTS

[75] Inventor: Hans-Gunnar Larsson, Västerås, Sweden

[73] Assignee: H.G. Tech AB, Västerås, Sweden

[21] Appl. No.: 818,462

[22] Filed: Jan. 6, 1992

Related U.S. Application Data

[63] Continuation of Ser. No. 488,032, May 23, 1990, abandoned.

[30] Foreign Application Priority Data

Dec. 9, 1987 [SE] Sweden ............................... 8704905

[51] Int. Cl.[5] ............................................ B29B 9/08

[52] U.S. Cl. ...................................... 264/8; 75/333; 75/337; 75/338; 264/11; 264/12; 425/7; 425/8

[58] Field of Search ........................... 264/5, 8, 11, 12; 425/6, 7, 8; 75/333, 337, 338, 339

[56] References Cited

U.S. PATENT DOCUMENTS

| | | | |
|---|---|---|---|
| 2,310,590 | 7/1941 | Marette | 75/333 |
| 3,813,196 | 5/1974 | Backstrom et al. | 425/7 |
| 4,374,075 | 2/1983 | Yolton et al. | 264/8 |
| 4,385,878 | 5/1983 | Larsson et al. | 425/7 |
| 4,394,332 | 7/1983 | Raman et al. | 75/333 |
| 4,474,604 | 10/1984 | Nakamura et al. | 264/8 |
| 4,523,621 | 6/1985 | Ray | 264/8 |
| 4,559,187 | 12/1985 | Haour et al. | 264/14 |
| 4,592,781 | 6/1986 | Cheney et al. | 264/8 |
| 4,647,305 | 3/1987 | Kumai et al. | 264/12 |
| 4,731,517 | 3/1988 | Cheney | 264/12 |

FOREIGN PATENT DOCUMENTS

| | | | |
|---|---|---|---|
| 63-183109 | 7/1988 | Japan | 264/11 |
| 198468 | 6/1938 | Switzerland . | |
| 0348237 | 3/1973 | U.S.S.R. . | |

*Primary Examiner*—Mary Lynn Theisen

*Attorney, Agent, or Firm*—Dennison, Meserole, Pollack & Scheiner

[57] ABSTRACT

Method and apparatus for atomizing a liquid to form a fine powder. The method includes the steps of mixing the liquid with a first fluid medium jet and projecting this first fluid medium jet into a barrier means which comprises a solid body or a second fluid medium jet projected by a nozzle in a direction substantially opposite to the first fluid medium jet. The first fluid medium jet containing fine particles diverges away from the barrier means, thus increasing contact surface between the first fluid medium jet and the liquid and increasing the intermixing therebetween.

13 Claims, 4 Drawing Sheets

METHOD AND EQUIPMENT FOR MICROATOMIZING LIQUIDS, PREFERABLY MELTS

This is a continuation of copending application Ser. No. 07/488,032 filed on May 23, 1990, now abandoned.

BACKGROUND OF THE INVENTION

The present invention relates to a method of atomizing liquids, preferably metal melts, in which liquid, preferably metal melt, is mixed into a media jet consisting of gas and/or liquid, so that the liquid is disintegrated into small particles, i.e. atomization is achieved. The invention also relates to a means for performing said method.

Such atomization is effected by disintegration of a preferably vertical tapping stream, or other pool of liquid, with the aid of preferably horizontal or vertical media flows consisting of gas or liquid.

When liquids are being atomized by disintegration of the liquid with the aid of a gas or fluid, extremely small particles are obtained within certain size intervals, the intervals sometimes being considerable. These known methods can be used for most types of liquids. However, they apply primarily to the production of powder from metal melts where a gas, e.g. nitrogen or argon, is used as atomization medium. Powder manufactured in this manner is often said to be manufactured inertly and is characterised by its low oxygen content and spherical form.

Powder-metallurgy processes using inertly manufactured powder encounter various problems relating to the size of the powder particles and/or their distribution. Finer and/or more restricted fractions of inertly manufactured powder are desirable for many applications nowadays. Such powder is conventionally obtained by screening off a coarser fraction, resulting in low yield, or via atomization processes using extreme gas flows and pressures. This powder is only used to a limited extent due to its high cost.

When atomizing metal melts in which a tapping stream is encountered by one or more gas jets, instability is produced on the surface of the melt in the contact surface between melt and gas, causing the melt to be stretched out in thin films. When these films have reached a certain thickness they will be broken up into threadlike pieces due to the surface tension of the melt and these pieces will be twisted off into a number of bits which assume a shape having the least possible surface energy, i.e. spherical shape.

These spherical drops solidify to powder particles extremely rapidly due to thermal radiation and convective dissipation of heat to the gas.

The size of particles formed in a certain volume element in the atomization process is affected by a number of parameters. The surface tension of the melt and the density and velocity of the atomizing medium are the most influencial parameters, besides the geometrical design of the atomization process.

It is difficult to influence the surface tension or density for a given melt, atomizing nozzle and atomizing medium, and it is therefore simplest to influence the particle size by means of the velocity of the atomizing medium. In most established atomizing processes, therefore, high velocities are strived for by means of high pressure in the atomizing medium and, in the case of gaseous media, by Laval design of the nozzles. However, the velocity of gaseous atomizing media decreases extremely rapidly after the nozzle so that usually only a small proportion of the atomizing process occurs within the region of maximum velocity.

A larger or smaller proportion of the melt will be disintegrated to particles in a region further away from the nozzle, where the velocity is considerably less, in some cases even as low at 10% of the maximum velocity. This gives a coarse powder with a wide spread between the smallest and largest particles.

Another problem entails the difficulty of getting the atomizing medium to get a "grip" on the liquid, and a large quantity thus passes outside the actual atomizing region, with low effectivity as a result.

SUMMARY OF THE INVENTION

The method according to the invention aims at a solution of the problems mentioned above and others related thereto, and is characterised in that close to the blow-out nozzle, i.e. when velocity of the media jet is still high, a barrier is effected to spread said jet in order to greatly increase the contact surface between liquid/-melt and media, at the same time producing greatly increased turbulence which is beneficial to the atomization process, and thus efficiently dispersing the liquid in the media whereupon the liquid is disintegrated into small particles, i.e. atomization is effectivized.

This is thus achieved by greatly increasing the contact surface between melt and atomizing medium, at the same time as a strong turbulence, favourable to the dispersion/atomization is obtained in the contact region.

Furthermore, the atomization process takes place within a short distance of the nozzle, where the velocity of the atomizing medium is still high, as well as a large proportion of the gas participating in the atomizing process. A high degree of efficiency is thereby obtained.

This method thus enables a radical reduction in the average particle size and less spread in the size distribution, at low cost.

The barrier may consist of a solid body, possibly cooled by water, for instance, or of a material which is thermally, mechanically and chemically resistant to the mixed jet. The barrier may also be formed by a counter-directed media flow of gas and/or fluid, i.e. the barrier in this case constitutes the limit/contact surface between the mixed stream and the counter-directed media jet.

The method can be applied to both vertical and horizontal atomizing processes. With a suitable choice of barrier, it is even possible to atomize a steel melt or alloys with an even higher melting point.

The invention also relates to a means for performing the method, and the features characteristic of this means are defined herein.

The medium for the media flow or the counter-directed media flow may be water, some other liquid such as liquid gas, or only gas such as nitrogen or argon or mixtures thereof. Alternatively the barrier may consist of a stationary or rotating plate, or the gas being blown in can be rotated.

BRIEF DESCRIPTION OF THE DRAWINGS

The invention, both method and means, is described in more detail with reference to the accompanying drawings, in which.

DESCRIPTION OF THE PREFERRED EMBODIMENTS

Figure 1:
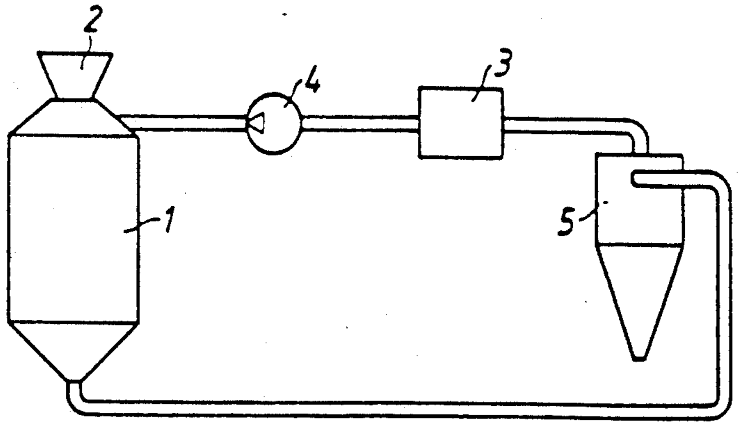
FIG. 1 shows a means for performing the method according to the invention.

In FIG. 1 a vertical atomizing chamber 1 is shown, having a casting box 2 for metal melt. Media (gas and/or fluid) are supplied via a gas cooler 3 and a compressor 4 to nozzles in the chamber 1. Atomized powder is carried from the chamber 1 via a pipe system to a cyclone 5 for treatment and separation. Metal melt, e.g. steel, is tapped from the casting box 2 (FIG. 2*a*) through a tapping arrangement in the bottom of this box, in the form of a preferably circular tapping stream 6 flowing vertically downwards into an atomizing chamber 1 filled with inert gas. In the upper part of the chamber, around the downwardly flowing tapping stream, is a gas nozzle 7 consisting of an annular nozzle or several smaller nozzles. The nozzle(s) create(s) an annular gas curtain 9 around the tapping stream which encounters (8) the tapping stream at an acute angle, some way from the nozzle(s) 7. When the gas encounters the tapping stream it is disintegrated and accompanies the gas flow. The barrier 10 of the invention is located at a suitable distance below the point of encounter.

The barrier 10 consists of metals having a high melting point, such as steel, or preferably of a gas barrier 11. This is produced by directing a gas and/or fluid jet upwardly, preferably in the same centre line as the tapping stream and the gas curtain, at a suitable distance below the nozzle(s), i.e. a second jet is directed preferably immediately towards the first jet 9-6 which contains fragments of melt 13 in its central portion.

When the two jets encounter each other, the velocity decreases in the region of the collision, and the pressure thus increases. Due to the increase in pressure, the gas expands radially outwards so that the velocity again increases. If the kinetic energy is equal in the two jets, the resulting direction will be substantially radial, i.e. perpendicular to the direction of the jets. The melt in the central portion of the first jet 13 will alter course in the collision region and will accompany the radially expanding gas, thus achieving efficient atomization.

Figure 2A:
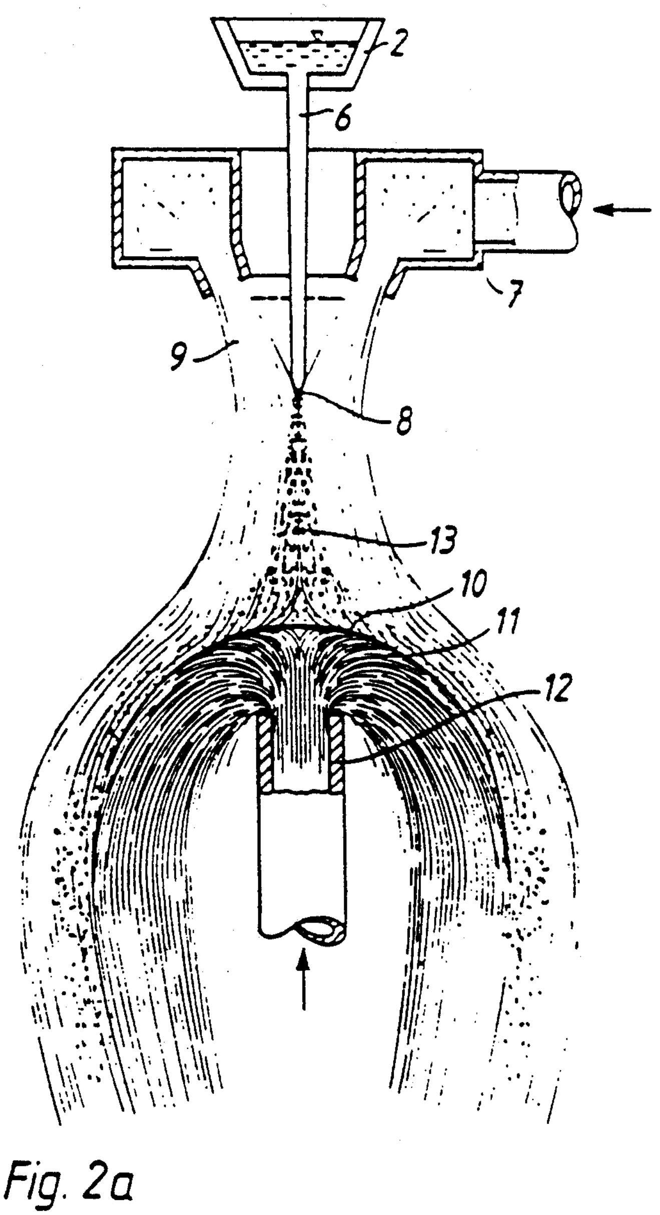
FIG. 2*a* shows the actual atomization process with a gas barrier.

The atomization process is further improved if the kinetic energy of the counter-directed jet is chosen less or greater than that of the first. In this case the expanding gas will assume a curved path, most resembling parabolic shape, (FIG. 2*a*). The improved atomizing process is due to fragments of the melt drawn along with the gas are constantly forced to change direction, thus giving them greater exposure of the gas.

The kinetic energy in the counter-directed gas flow is advantageously chosen less than that in the first, thus producing the effect described above, while the overall direction of the gas/particle mixture will be obliquely downwards. If the ratio of kinetic energy is inverted the overall flow will be obliquely upwards.

Figure 2B:
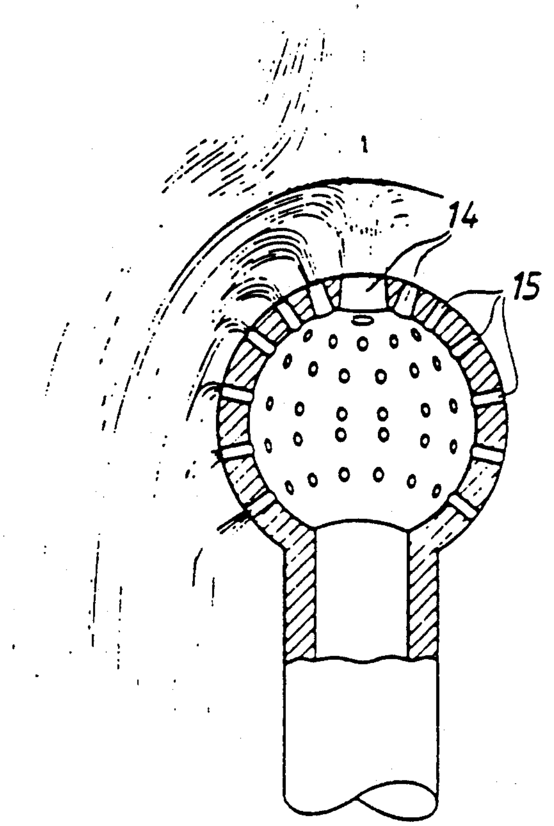
FIG. 2*b* shows an example of a nozzle producing the barrier.

The kinetic energy in the counter-directed jet may be 10 to 1000% of the first, preferably 30–60%. According to this embodiment, the barrier may be obtained from a nozzle as shown in FIG. 2*b*, with one or more central nozzles 14 for barrier jets. Besides these, auxiliary nozzles 15 can be arranged to prevent liquid (melt) from coming into contact with undesired parts of the barrier nozzle.

Figure 3:
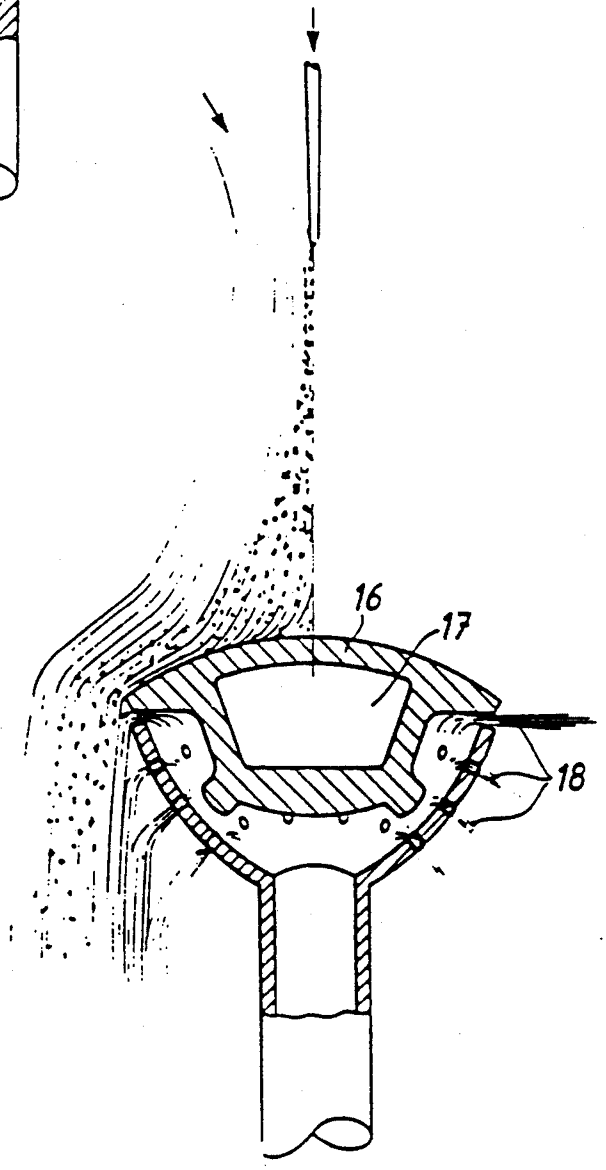
FIG. 3 shows another embodiment of the barrier.

A similar effect to that described above is obtained if the barrier consists of a solid body, such as a circular plate located at right angles to and having the same central line as the mixed jet. (See FIG. 3) The compression of the gas thus occurs against this plate 16, after which expansion occurring radially outwards will pull with it a thin film of the melt.

When this film of melt reaches the edge of the plate it will be disintegrated into particles in a process similar to that described above. The body constituting the barrier may be uncooled or cooled in some suitable manner from below, e.g. by means of water channels 17.

If the bodies are uncooled, they should be made of a material which is thermally, mechanically and chemically resistant to the hot melt and the gas. If the body is cooled, a protective layer will be formed against the hot metal by the metal nearest the plate solidifying.

The barrier may preferably have a geometry congruent with the cross section of the portion of the gas jet mixed with melt 13. The size of the barrier is suitably such that its longitudinal dimensions are equal to the cross section of the part of the gas stream mixed with melt, at the point of encounter, or up to 20 times greater, preferably 4 to 10 times greater than said cross section.

A solid barrier (such as in FIG. 3) may also be used, which is gradually melted and included in the atomized powder (not shown).

With the method and means described above, where gas flows out of nozzles or over the edge of a surface, secondary currents (turbulence) will occur in the boundary between the flowing and the stationary gas. When liquids having a high melting point are being atomized, this turbulence may cause molten particles to be drawn into and welded fast on the nozzles and other surfaces where it is not desired. In order to prevent such effects on bodies constituting the barrier, or on nozzles creating gas barriers, these may be provided with auxiliary nozzles, suitably located, with the object of eliminating turbulence in critical areas, thus preventing molten particles from becoming attached. These auxiliary nozzles may have the appearance of those shown at 15 in FIG. 2*b*, or at 18 in FIG. 3.

Figure 4:
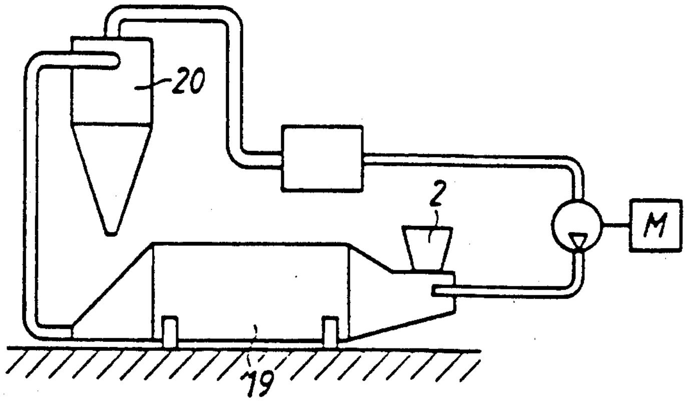
FIG. 4 shows an alternative means for performing the method.
Figure 5A:
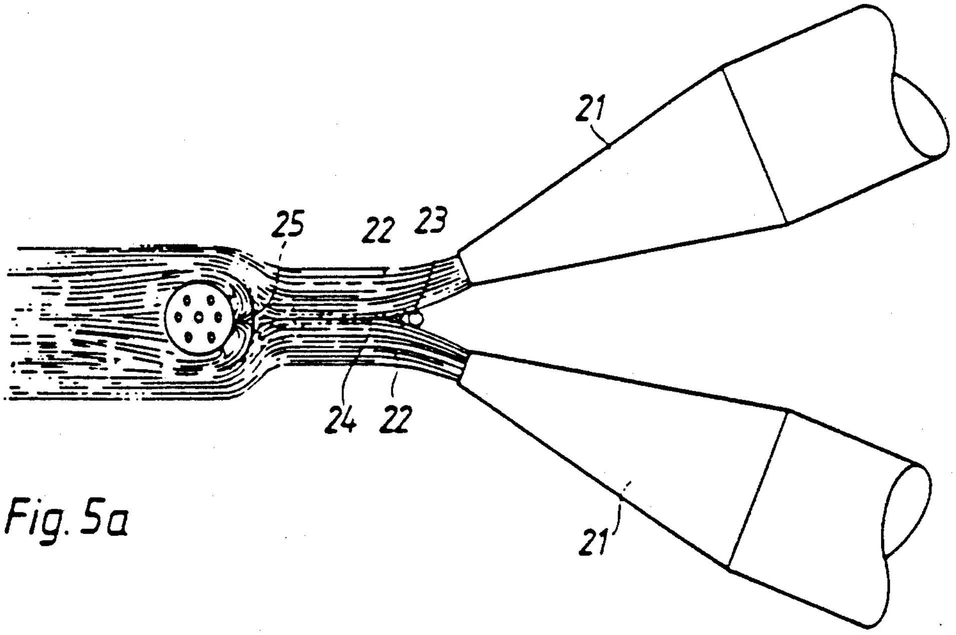
FIG. 5*a* shows the corresponding atomizing process with a gas barrier, seen from above.
Figure 5B:
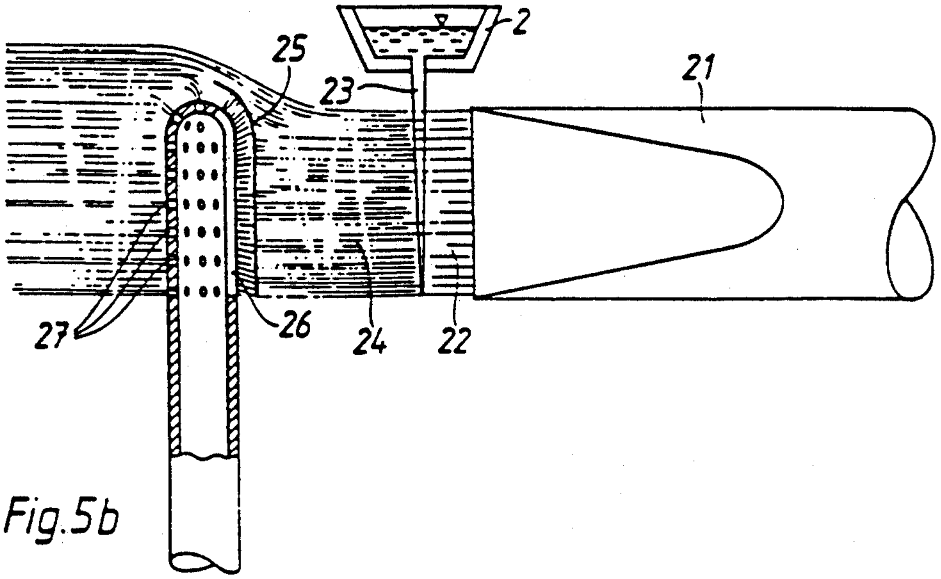
FIG. 5*b* shows this process seen from the side with a detail of the nozzle producing the barrier.

FIG. 4 shows a horizontal atomizing equipment with its atomizing chamber 19 and cyclone 20. The atomizing equipment comprises a closed system, preferably kept under a certain overpressure (see FIGS. 1 and 4). This may be 500 mm water column, for instance, so that air is prevented from entering. As mentioned, the casting box 2 is arranged at one end of the box (1, 19). FIGS. 5*a* and 5*b* show atomization as performed in the equipment shown in FIG. 4. Medium 22 flows from nozzles 21 (for instance elongate, slot-shaped or a row or small nozzles) towards the tapping stream 23. The mixed stream thus obtained then encounters a barrier (solid or produced by one or more nozzles 25) and is deflected thereby, thus producing excellent atomization. The auxiliary nozzles are arranged in FIG. 5*b* as one slot-shaped nozzle 26 and several small, separate nozzles 27. The nozzle 26 may even produce the barrier itself.

A flow phenomenum which arises when two jets of gas or fluid encounter each other at a certain angle is utilized to create the mixed jet 24 in FIGS. 5*a–b*.

It is known that at or immediately before the point of intersection between two media jets encountering each other at an angle, a flow phenomenum occurs which dominates the process to a greater or less extent depending on the size of the angle. At small angles, e.g. smaller than 5°, the injector action due to the sub-pressure immediately before the point of intersection is the dominant property, whereas at larger angles, e.g. 120°, there will be a backward flow of media in relation to the main direction of flow of the media jets.

Both these phenomena can be exploited by selecting an angle between two media jets 22, 22 so that a backward flow of media occurs and that, within a short distance, it is drawn back into the media jets by the injector action. The result will be that a zone is formed in front of the intersection point, where there is no defined direction, but two vortex eddies with a constant exchange between returning media and media drawn in. Altering the angle will increase or decrease the extent of this zone. The angle between the media jets may be 0°–60°, but is preferably 5°–20°.

The nozzles 21, 21 may be arranged to give two horizontally directed media jets, parallel in vertical equipment, with great extension vertically as compared with the width, and with an angle in the horizontal plane in relation to each other. The zone described above will then be formed. The tapping stream 23 will flow from the top, down in the vertical zone formed all along the height of the nozzle. The stream will be successively disintegrated on its way down, and mixed into the passing atomizing medium.

Media jets with considerable extension in one direction can be achieved by means of slot-shaped nozzles or by a number of circle nozzles, for instance, arranged close together in a row. Depending on prevailing pressure and the medium used, the nozzles for the media jets may be designed for sub-pressure or over-critical pressure conditions (Laval nozzle).

When the flow of melt is correctly adjusted to the capacity of the media nozzle, mixing, i.e. partial atomization, will occur along the entire height of the nozzle.

The advantage of the arrangement of nozzles 21 described above is that a more homogeneous mixing (partial atomization) of the liquid into the media can be achieved which, even after passing a barrier, results in a narrower fraction for the particles. The nozzle arrangement 21 can also be used for complete atomization, without a barrier, wereby particles can be produced within a narrow size interval but with a larger average particle size.

Figure 6:
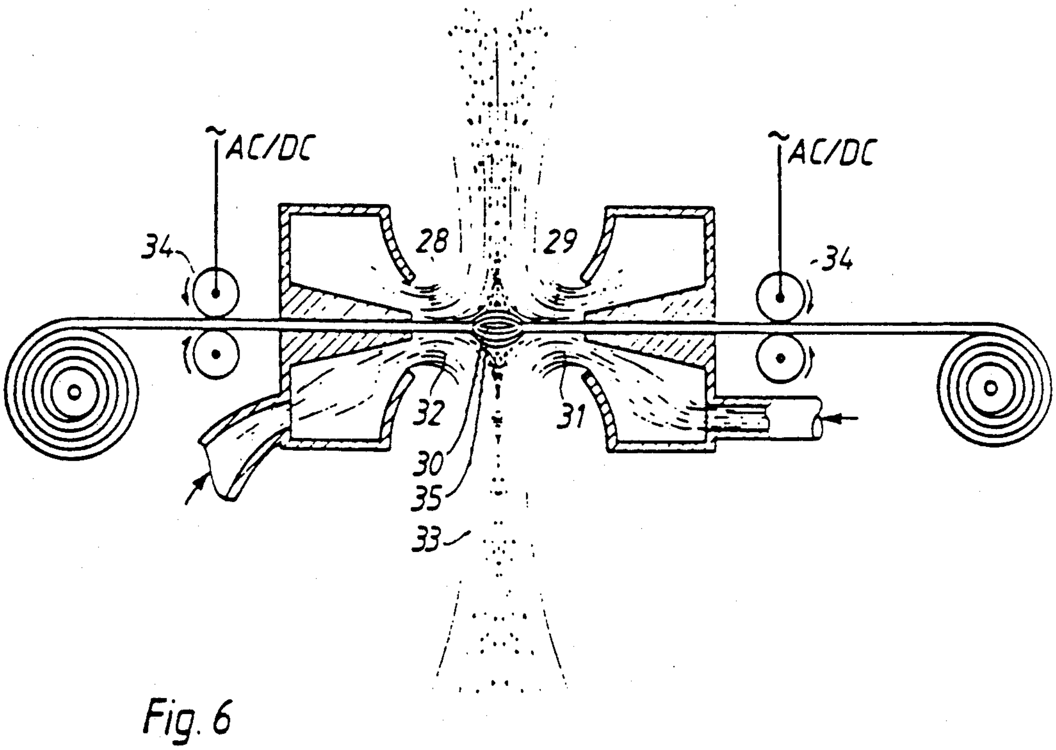
FIG. 6 shows an alternative atomizing process.

FIG. 6 shows an alternative embodiment of the method and means according to the invention. An electric arc 30 is arranged between two electrodes 28, 29. Media streams 31 (gas and/or fluid) are directed towards the electric arc, and media jets from the opposite direction 32 act as barrier. Efficient atomization of the liquid 35 formed in the electric arc is obtained.

In this case the liquid to be atomized is obtained from at least one of the electrodes 29. However, liquid can also be obtained from a solid body which is melted by a laser or the like (not shown) in similar manner. Feeding the electrodes in FIG. 6 along, or the laser, can be arranged by means of a feeder 34. The nozzles for both the first media and the barrier media may be annular, or may consist of several small nozzles. The method according to FIG. 6 is preferably carried out in a chamber similar to that described earlier (not shown).

Particles formed at the atomization, at drawn into the gas jets towards the other end of the chamber, and before encountering the end of the chamber, they will have solidified to powder due to radiation and convective heat dissipation to the gas. An outlet is arranged in the chamber, preferably at its end, towards which the gas/powder mixture flows.

The chamber is connected from the outlet by pipes, to a cyclone where the powder and gas are separated. After separation, the gas may travel to a compressor via a gas cooler, for recirculation to the atomizing nozzles. The system includes other requisite valves, cooling equipment and control means for regulating gas pressure, temperature and the various media flows, etc.

The means and the methods described above can be varied in many ways within the scope of the claims.

I claim:

1. A method for atomizing a liquid to form a fine powder, comprising the steps of:

mixing said liquid with a first fluid medium jet, causing said liquid to be disintegrated into fine particles;

projecting, at a high rate of speed, said first fluid medium jet containing disintegrated liquid into a barrier means comprising a solid body, such that said first fluid medium jet and fine particles diverge away from and around said barrier means, thus increasing contact surface between said first fluid medium jet and said liquid and increasing intermixing therebetween;

after diverging, solidifying said disintegrated liquid into a fine powder downstream of said barrier means; and subjecting said solid body to cooling so as to deposit a solidified layer of atomized melt thereon and protect the body from attack by the liquid being atomized, said body being stationary or rotating.

2. A method as claimed in claim 1, wherein the solid body is a material selected from the group of materials thermally, mechanically and chemically resistant to said fluid medium jet containing disintegrated liquid, said body being stationary or rotating.

3. Apparatus for atomizing a liquid to form a fine powder, comprising:

a casting box for a liquid to be atomized comprising a metal melt, said casting box including means for tapping a liquid stream or pool to be atomized;

first nozzle means connected with a source of fluid for providing a first fluid medium jet adapted, in conjunction with said tapping means, for tapping and mixing with the liquid stream or pool to be atomized;

a barrier means oriented with respect to said first nozzle means so that it is in the path of the first fluid medium jet, said barrier means adapted for causing divergence of said first fluid medium jet away from and around said barrier means, and comprising a second nozzle means comprising at least one nozzle connected to a source of fluid and oriented for directing a second fluid medium jet in a direction substantially 180° to the first fluid medium jet; and means for solidifying atomized metal melt downstream of said barrier means.

4. A method for atomizing a liquid to form a fine powder, comprising the steps of:

mixing said liquid with a first fluid medium jet, causing said liquid to be disintegrated into fine particles;

projecting, at a high rate of speed, said first fluid medium jet containing disintegrated liquid into a barrier means comprising a second fluid medium jet projected by a nozzle in a direction substantially 180° to said first fluid medium jet, such that said first fluid medium jet and fine particles diverge away from and around said barrier means, thus increasing contact surface between said first fluid medium jet and said liquid and increasing intermixing therebetween; and after diverging, solidifying said disintegrated liquid into a fine powder downstream of said barrier means.

5. Apparatus for atomizing a liquid to form a fine powder, comprising:

a casting box for a liquid to be atomized comprising a metal melt, said casting box including means for tapping a liquid stream or pool to be atomized;

first nozzle means connected with a source of fluid for providing a first fluid medium jet adapted, in conjunction with said tapping means, for tapping and mixing with the liquid stream or pool to be atomized;

a barrier means oriented with respect to said first nozzle means so that it is in the path of the first fluid medium jet, said barrier means adapted for causing divergence of said first fluid medium jet away from and around said barrier means, and comprising a solid body, a second nozzle means connected to a source of fluid and oriented for directing a second fluid medium jet in a direction substantially 180° to the first fluid medium jet, or both said solid body and said second nozzle means, and means for solidifying atomized metal melt downstream of said barrier means, wherein said barrier means is provided with at least one auxiliary nozzle connected to a source of fluid for preventing liquid from coming into contact with particular parts of the nozzle or solid body.

6. A method as claimed in claim 4, wherein the barrier comprises gas flow, liquid flow or both produced by one or more nozzles, and having kinetic energy 10 to 1000% of the kinetic energy in the first fluid medium jet.

7. A method as claimed in claim 6 wherein the kinetic energy is 30 to 60% of the kinetic energy of the first fluid medium jet.

8. A method as claimed in any one of claims 1, 2 or 4, wherein the solid body or nozzle is provided with at least one auxiliary nozzle projecting a fluid stream which prevents said first fluid medium jet from coming into contact with particular parts of the nozzle or barrier body.

9. A method as claimed in any one of claims 1, 2 or 4, including a step of producing liquid to be atomized by supplying thermal energy to a metal or metal alloy.

10. A method as claimed in claim 9, wherein the thermal energy is produced by means of an electric arc or laser.

11. Atomizing apparatus as claimed in claim 5, wherein the barrier means comprises a solid body of a material which is thermally and chemically resistant to the first fluid medium jet.

12. Atomizing apparatus as claimed in claim 3 or 5, additionally comprising means for supplying metal or metal alloy in the form of wire, rods or powder, and means for supplying thermal energy in the form of laser or electric arc to the metal or metal alloy for melting.

13. Atomizing apparatus as claimed in claim 3 wherein the solid body barrier means is rotatable and water cooled.

* * * * *